D. R. PRATT.
Car Coupling.
No. 5,961.
Patented Dec. 12, 1848.
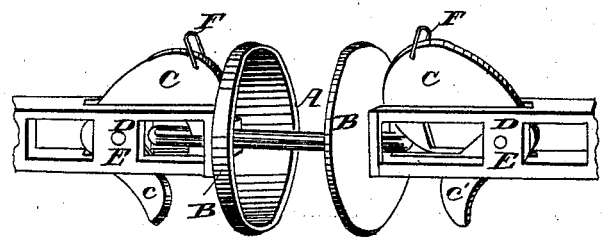

UNITED STATES PATENT OFFICE.

DANIEL R. PRATT, OF WORCESTER, MASSACHUSETTS.

CAR-COUPLING.

Specification of Letters Patent No. 5,961, dated December 12, 1848; Antedated June 12, 1848.

*To all whom it may concern:*

Be it known that I, DANIEL R. PRATT, of the city of Worcester, in the county of Worcester and State of Massachusetts, have invented a new and useful Coupling for Railroad-Cars, called Pratt's Self-Acting Car-Coupling, which is described as follows, reference being had to the annexed drawing of the same making part of this specification.

The figure is a perspective view of the coupling, the link being attached to one of the hooks and about to lift and become engaged with the other.

The various self acting couplings for connecting rail-road cars heretofore invented have failed to meet with general favor from various causes which will be evident on examining their construction. The majority of them fail on account of their complexity and uncertainty of operation. The Bussey coupling is among the best. That, however, is not without objection, on account of a tumbler, dog and spring being employed to hold the link—the latter being uncertain in its action and the former no so arranged as to be disconnected by the engineer or attendant when distant from the coupling.

My coupling is certain in its action, as the coupling hook is actuated by gravity and percussion which never fail, to engage the hook with the link and the parts being so arranged that the hook can be disengaged from the link by the attendant or engineer by simply drawing a cord or chain attached to the hook and leading to any part of the train.

A represents the link made of wrought iron, or any suitable material in the form of a link of a chain, of a proper size and strength for the purpose intended for coupling the cars.

B, B, are the buffers cast or wrought sufficiently concave and of the requisite form and size to direct the link to the hook, secured to the ends of the draw-bars by their convex surfaces, their concave surfaces being placed toward each other, each buffer being in its general form similar to that of an oval bell, with an opening at the apex.

C, C, are the eccentric hooks cast or wrought substantially of the form represented, or other form that will cause the link to become engaged therewith as the cars approach each other; or as one car approaches another which is stationary inserted into mortises in the draw-bars to which they are connected by pins D, on which they turn.

E, E, are the draw-bars attached to the cars containing the buffers, hooks, and link. These draw-bars are made of wrought iron, or other suitable material, of suitable size and strength and mortised vertically and horizontally for the insertion of the hooks and link and perforated for the insertion of the axle D of the hooks and open at the sides to admit of access to the link and hooks laterally where required.

F, F, are rings inserted into the hooks to which cords or chains are attached leading to any convenient place for the attendant to lay hold of when he wishes to disengage or uncouple the cars.

The operation of coupling a pair of cars together is described as follows: The link being secured by one of the draw-bars, it strikes, as the cars approach the buffer of the opposite draw-bar which is sufficiently concave in its form to guide the link to the eccentric hook C which it raises and passes, instantly striking the lower part of the hook C' and compelling it to close and secure the link, without the intervention of the hand.

The eccentric hook C may be easily raised from the top of the car, or on the platform, thus disconnecting the cars, even when in rapid motion, by drawing the rope attached to the ring F, or by laying hold of the ring. The gravity of the hook alone would be sufficient to cause it, after being raised, to descend and interlock with the link; but to render the operation certain the link, in moving forward horizontally, must strike the tail end C' of the link and cause the hook to turn on its axle D and have a positive and certain motion on its axle and become interlocked with the link; in which position it will remain till raised. Springs might be employed to actuate the hook but they would not be so certain and effectual as the gravity and leverage of the lower part of the hook. The concave buffers answer the double purpose of guides for the link and buffers for the cars—serving effectually for the latter purpose;—even when the pin is used for connecting the link they are very valuable.

I do not claim the invention of a self acting coupling for cars, nor the employment of an eccentric tumbler, dog, and spring, nor a flaring mouth to guide the link to the connecting tumbler, but—

What I do claim as my invention and desire to secure by Letters Patent, is—

The combination of the hooks C C, mortised draw-bars E E, buffers B B, with the open link A, made, arranged, and operated in the manner and for the purpose herein set forth.

In testimony whereof I have hereunto signed my name before two subscribing witnesses this 22d day of June 1848.

DANIEL R. PRATT.

Witnesses:
 RICH BLISS,
 FLORELIO BILLINGS.